(12) United States Patent
Kashyap et al.

(10) Patent No.: US 8,174,989 B2
(45) Date of Patent: May 8, 2012

(54) METHOD AND APPARATUS FOR COST-EFFECTIVE DESIGN OF LARGE-SCALE SENSOR NETWORKS

(75) Inventors: Akshay Kashyap, Champaign, IL (US); Luis A. Lastras-Montano, Cortlandt Manor, NY (US); Zhen Liu, Tarrytown, NY (US); Honghui Xia, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 11/692,874

(22) Filed: Mar. 28, 2007

(65) Prior Publication Data

US 2007/0230353 A1      Oct. 4, 2007

Related U.S. Application Data

(60) Provisional application No. 60/786,663, filed on Mar. 28, 2006.

(51) Int. Cl.
H04L 12/26 (2006.01)

(52) U.S. Cl. ..................................... 370/238

(58) Field of Classification Search ............... 370/238, 370/252, 389; 382/253, 239, 299; 342/21, 342/70, 174, 165, 87, 54, 552
See application file for complete search history.

(56) References Cited

U.S. PATENT DOCUMENTS

| 6,081,230 | A * | 6/2000 | Hoshino et al. | 342/357.32 |
| 7,194,463 | B2 * | 3/2007 | Zhao et al. | 707/5 |
| 7,649,484 | B1 * | 1/2010 | Wegener | 341/155 |
| 2003/0142699 | A1 * | 7/2003 | Suzuki et al. | 370/535 |
| 2006/0149509 | A1 * | 7/2006 | Chyun | 702/189 |

OTHER PUBLICATIONS

D. Marco, E. J. Duarte-Melo, M. Liu, and D. L. Neuhoff, "On the many-to-one transport capacity of a dense sensor network and the compressibility of its data," in *Lecture notes in Computer Science*, L. J. Guibas and Eds. Springer, 2003, pp. 1-16.

A. Scaglione and S. D. Servetto, "On the interdependence of routing and data compression in multit-hop sensor networks," In *Proceedings of IEEE MOBICON*, 2002.

D. Slepian and J. Wolf, Noiseless Coding of Correlated Information Sources, Transactions on Information Theory, vol. IT-19, pp. 471-480, Jul. 1973.

R. Zamir and T. Berger, "Multiterminal source coding with high resolution," IEEE Transactions on Information Theory, vol. 45, pp. 106-117, Jan. 1999).

Z. Xiong, A. Liveris, and S. Cheng, Distributed source coding for sensor networks, IEEE Signal Processing Magazine, vol. 21, pp. 80-94, Sep. 2004.

* cited by examiner

*Primary Examiner* — Dang Ton
*Assistant Examiner* — Nourali Mansoury
(74) *Attorney, Agent, or Firm* — Ference & Associates LLC

(57) ABSTRACT

Arrangements and methods for developing a software toolkit that can be used to design or obtain parameters for a sensor network. High-level guidelines on the basic relations between sensor network parameters like number of sensors, degree of quantization at each sensor, and the distortion requirements, based on a deep analysis on two basic coding possibilities (multiplexed point-to-point, distributed) are contemplated. By evaluating tradeoffs among the various parameters, an optimization framework to obtain the most cost-effective design with required quantization capabilities pertaining to given distortion criterion is provided.

18 Claims, 3 Drawing Sheets

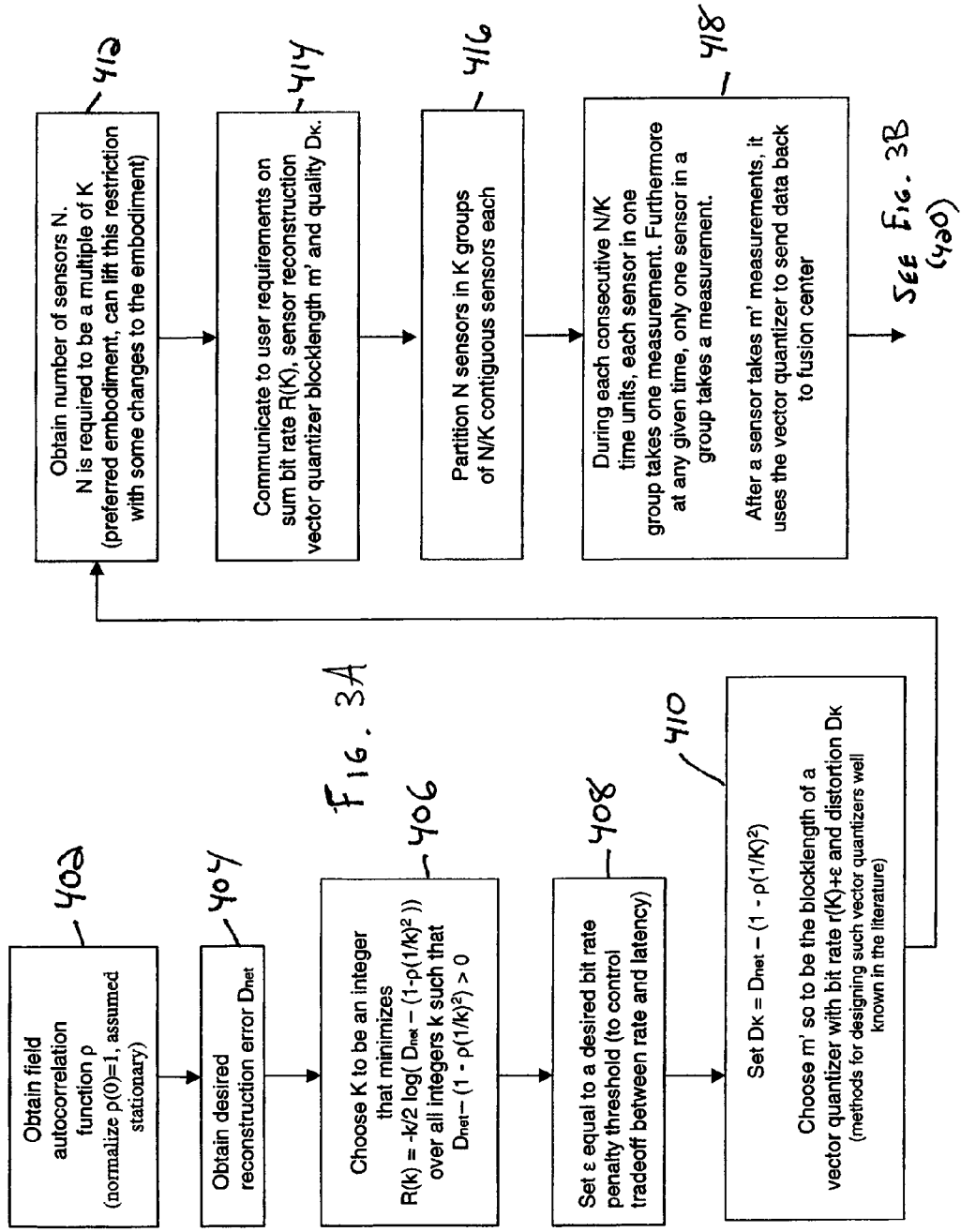

See FIG. 3A (418)

420 —

Fusion center decodes information from each of the N sensors using N separate decoders of the vector quantizer

↓

422

For each s in the interval (0,1), the fusion center reconstructs the field value X(s) using the following algorithm:

- Find the sensor (active or inactive) closest to the location s. From the group to which this sensor belongs, select the sensor that is active (this is, has taken a direct measurement). The location of this sensor is s*.
- Multiply the decoded value for location s* times r(s-s*).
- The result of the multiplication is the fusion center reconstruction for the field sample X(s).

↓

END

FIG. 3B

METHOD AND APPARATUS FOR COST-EFFECTIVE DESIGN OF LARGE-SCALE SENSOR NETWORKS

CROSS-REFERENCE TO RELATED U.S. APPLICATION

This application claims priority from U.S. Provisional Patent Application Ser. No. 60/786,663, filed on Mar. 28, 2006, and which is fully incorporated by reference herein.

FIELD OF THE INVENTION

The present invention generally relates to the field of intelligent networks formed by sensors that can monitor physical phenomena over a large field. In particular, the invention relates to the design of a large scale sensor network that integrates data compression and network communication.

BACKGROUND OF THE INVENTION

Recent advances in wireless communications and microelectro mechanical systems have enabled the development of small, low-cost sensors that possess sensing, signal processing and wireless communication capabilities. These sensors can be dispersed geometrically in large scale and be organized into networks that can monitor physical phenomena over a large field. Such distributed sensor networks can be applied to a wide range of potential applications, like large-scale reconnaissance, surveillance, environmental monitoring, anomaly detection and disaster recovery, etc.

Distributed sensing is faced with many challenges pertaining to the scarcity of power, bandwidth, and computing resources. A central problem is to find the most efficient way to deploy the sensors and use them to collect information and send data to the central data collector. Some natural questions include: how many sensors should be deployed; what degree of quantization power should each sensor possess; at what rate should data be sampled and how should they be encoded/decoded and be sent to the central collector in order to meet some distortion criteria; is the communication network formed by the sensing nodes capable of transferring the generated data rate; and more generally, is the proposed sensor network feasible. Effective design of distributed sensor networks requires fundamental understanding of the tradeoffs between sensor network parameters like number of sensors, degree of quantization at each sensor, and the distortion requirements, etc.

A standard technique for sending information from the sensors to a data fusion center would be to simply treat each sensor's observation as an independent measurement and then employ well understood techniques for its transmission, including standard quantization and channel coding. Independently of the type of channel coding performed, the standard quantization referred to in here can also be referred to as a very basic "point-to-point" coding scheme. While appropriate for some applications, this scheme becomes infeasible when the there are too many sensors sharing a resource-limited data transmission environment, such as the available wireless spectrum.

Consequently, limiting the sizes of the messages emitted by the stations without losing the quality of the sampled data is of significant interest. These stations are assumed to operate in isolation, this is, where no cooperation is allowed. A fundamental observation is that the efficiency of such networks cannot be better than a hypothetical network where such collaboration is allowed. In particular, in principle one would like to design sensor networks with performance close to a network with full collaboration; one may call the latter "joint coding" (alternatively referred to herein as "centralized coding").

The class of techniques that attempt to capitalize on the correlations of the data to improve system performance are called "distributed coding". Distributed coding has been the subject of many theoretical investigations in the past, for example, for a small number of sensors [T. Berger, "Multiterminal Source Coding," Information Theory Approach to Communication, (CISM Courses and Lecture Notes No. 229), G. Longo, Ed., Wien and New York: Springer-Verlag, 1977]. More recent theoretical research addresses problems and characteristics of large sensor networks (D. Marco and E. J. Duarte-Melo and M. Liu and D. L. Neuhoff. On the many-to-one transport capacity of a dense wireless sensor network and the compressibility of its data, Lecture notes in Computer Science, editor, L. J. Guibas and F. Zhao, Springer, 2003, 1-16. and P. Ishwar and A. Kumar and K. Ramchandran, On Distributed Sampling in Dense Sensor Networks: a "Bit-Conversation" Principle, IEEE Journal on Selected Areas in Communication, July, 2003). Practical research has lagged theoretical developments. The implementation of efficient distributed coding algorithms as conceived in most research relies on recent years' algorithmic breakthroughs [Slepian, D., Wolf, J K: Noiseless Coding of Correlated Information Sources. IEEE Trans. Information Theory, IT-19, 1973, pp. 471-480.]. Most practical research follows the model established by the theoretical investigations, with significant results available only for two sensors [Z. Xiong, A. Liveris, and S. Cheng, "Distributed source coding for sensor networks", IEEE Signal Processing Magazine, vol. 21, pp. 80-94, September 2004]. However, distributed coding schemes continue to present significant practical roadblocks as they are further developed.

In some situations, it is desirable to design sensor networks with many inexpensive sensors instead of fewer more expensive ones. A central question then is whether it is feasible to design very dense sensor networks in which the sum of the total amount of information broadcasted by each sensor does not grow in an unbounded manner as we add more sensors to the environment (this is, as we make the network denser).

Recent work by Kashyap et. al. have demonstrated that it is possible to use distributed coding as well as a simple multiplexed point-to-point coding technique to attain this goal.

Accordingly, in view of the foregoing, while research continues to advance different coding techniques, a need continues to be recognized in connection with providing and implementing more practical and effective techniques.

SUMMARY OF THE INVENTION

In view of the foregoing problems, drawbacks, and disadvantages of the conventional approaches, it is an exemplary feature of the present invention to employ deep understanding on the basic relations between various sensor network parameters to automate the process of design and optimization of sensor networks and related applications.

Generally, two approaches are broadly contemplated herein. In a first general approach, a distributed coding scheme may be employed to take advantage of distributed coding characteristics in the context of a large-scale sensor network. In a second general approach, a simple ("multiplexed point to point") coding scheme can preferably be implemented using scalar quantization at the sensors, and this represents a vast improvement over traditional, "basic" point-to-point coding schemes. In both cases, bandwidth can be kept within a fixed maximum regardless of the number of sensors and/or density of the sensor network in question.

Generally, the present invention provides means to develop a software toolkit that can be used to design (obtain parameters for) a sensor network. A method according to the present invention requires as input the geographical location of the sensors, the field statistics, the desired field reconstruction error, and the cost of sensor with different capabilities. Taking the above measurement data as input, a method of present invention uses advanced optimization techniques to obtain the basic parameters for the sensor networks such as the minimum number of sensors required to achieve the desired reconstruction error, and suggests the efficient coding scheme accordingly.

To elaborate further, in a preferred embodiment of the present invention, high-level guidelines are provided on the basic relations between sensor network parameters like number of sensors, degree of quantization at each sensor, and the distortion requirements, based on a deep analysis of several basic coding possibilities (basic point-to-point; joint [or centralized], distributed coding and multiplexed point-to-point).

In summary, one aspect of the invention provides a method of managing a sensor network, said method comprising the steps of: obtaining input related to sensor network characteristics; optimizing a cost function on the basis of obtained input; based on the cost function, choosing a number of sensors from which to obtain data; partitioning the sensors into groups; accepting sensor measurement data at a predetermined location; and constructing a field data sample at the predetermined location.

Another aspect of the invention provides an apparatus for managing a sensor network, said apparatus comprising: an arrangement for obtaining input related to sensor network characteristics; an arrangement for optimizing a cost function on the basis of obtained input; a choosing arrangement which, based on the cost function, chooses a number of sensors from which to obtain data; a partitioning arrangement which partitions the sensors into groups; an accepting arrangement which accepts sensor measurements; and a constructing arrangement which constructs a field data sample.

Furthermore, an additional aspect of the invention provides a program storage device readable by machine, tangibly embodying a program of instructions executable by the machine to perform method steps for managing a sensor network, said method comprising the steps of: obtaining input related to sensor network characteristics; optimizing a cost function on the basis of obtained input; based on the cost function, choosing a number of sensors from which to obtain data; partitioning the sensors into groups; accepting sensor measurement data at a predetermined location; and constructing a field data sample at the predetermined location.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIGS. 3A and 3B provide a flowchart for a preferred multiplexed point-to-point coding scheme in accordance with at least one embodiment of the present invention.

DESCRIPTION OF THE PREFERRED EMBODIMENTS

Figure 1:
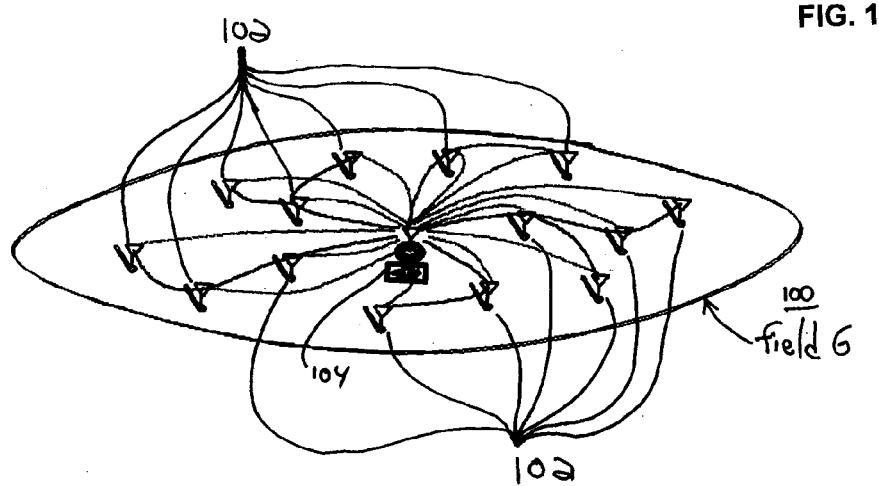
FIG. 1 illustrates a sensing field with sensors.

Very generally, as mentioned above, two approaches are broadly contemplated herein. In a first general approach, a distributed coding scheme may be employed to take advantage of distributed coding characteristics in the context of a large-scale sensor network. Essentially, if it is assumed that a correlation structure is known at each sensor in a network, it is possible to achieve a sum rate that is within a maximum independent of the number of sensors. In a second general approach, a simple (multiplexed point to point) coding scheme can preferably be implemented using scalar quantization at the sensors. In that sense, sensors would not need to have any information about a correlation structure, and would make use of an assumption that the sensors are synchronized. In this way, a sum rate can also be achieved that is within a maximum constant independent of the number of sensors. In both cases, it will be appreciated that bandwidth requirements remain bounded by a constant regardless of the number of sensors and/or density of the sensor network.

The disclosure first turns to a general discussion of sensor networks and their components as may be employed in accordance with at least one presently preferred embodiment of the present invention. Thence, some discussion is provided regarding conceivable, and preferred, distributed coding and multiplexed point to point coding schemes that may be utilized. Further background details that may be of assistance in appreciating ancillary or environmental aspects relating to the employment of at least one embodiment of the present invention may be found in the paper attached hereto as an Appendix, "Distributed source coding in dense sensor networks", by A. Kashyap et al.

Generally, there are broadly contemplated herein, in accordance with at least one preferred embodiment of the present invention, methods and apparatus for a cost effective design of large scale sensor networks. Such sensor networks combine micro-sensor technology, signal processing, low power computation, low cost and low power wireless communication into an integrated system, and provide monitoring and control capabilities in many applications including large-scale reconnaissance, surveillance, anomaly detection and disaster recovery, etc.

One idea contemplated herein is based on the observation that data in a real sensing field becomes increasingly correlated as the distance between sensing locations decreases. Consequently, there is broadly contemplated herein a distributed source-coding scheme, which is shown to have the promise of very significant improvements in bandwidth requirements. However, in such a distributed scheme, practical challenges may also be present that will continue to require further study and experimentation. Though there likely exist commercially available sensors that could be equipped with enough memory and processing power can implement a distributed coding algorithm as broadly contemplated herein, challenges in developing and implementing software for managing distributed coding (as contemplated herein) of massive sensor networks are recognized as formidable. Accordingly, multiplexed point-to-point coding schemes, as broadly contemplated herein, present the advantage of being simple enough to be implemented in practical settings even with extremely resource-constrained sensors.

Turning to some basic concepts relating to sensor networks and their components and related parameters shall be discussed, as a matter of relevance to all conceivable coding schemes, reference may be made, as needed, to the Appendix (Kayshap, supra). Shown in FIG. 1 is a sensing field G (100) with a plurality of sensors 102 distributed therethroughout, all commonly connected (via any suitable wired or wireless means) to a data collecting "hub" 104. At hub 104, measurements from the sensors 102 are taken in and calculated in a manner to effectively interpret the phenomena recorded by sensors 102. Such a hub 104 is often referred to as a "fusion center" or "data fusion center".

Figure 2:
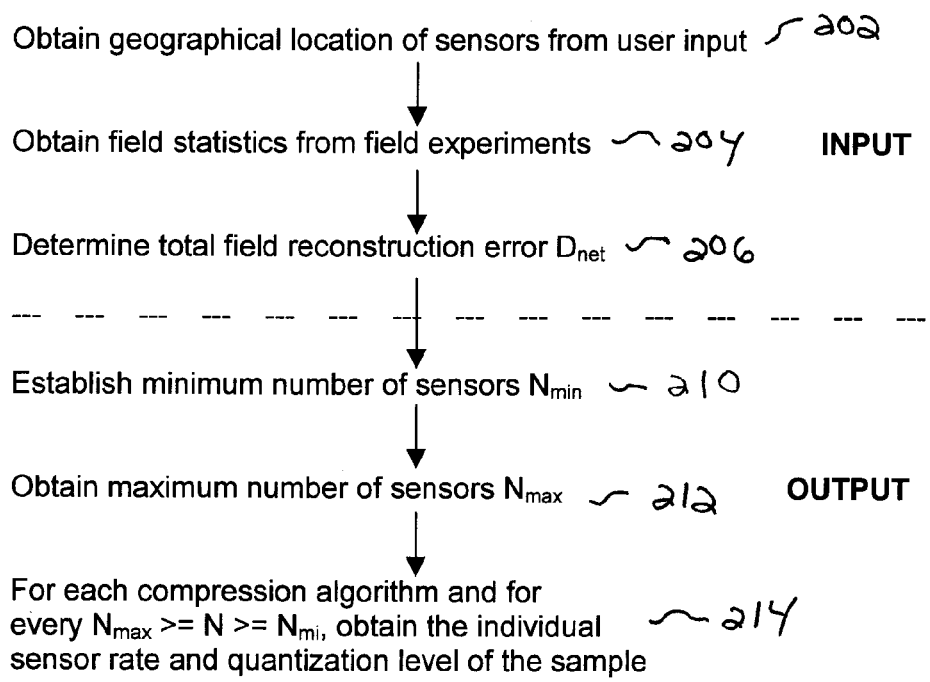
FIG. 2 sets forth an algorithm for establishing a minimum number of sensors.

Generally, the following steps (as shown in FIG. 2), may preferably be undertaken in accordance with at least one embodiment of the present invention:

Obtain geographical locations of sensors from user input (202).

Obtain field statistics from field experiments (204).

Obtain total field error desired $D_{net}$ from user input (206).

Choose or establish a minimum number of sensors $N_{min}$ so as to make the sampling error sufficiently small (210).

For any coding technique, the total field reconstruction error can be upper bounded by the sum of a quantization error and a sampling error $J_{MSE} <= E_Q + E_S$ Therefore, even with an infinite rate available ($E_Q$=0), a minimum number of samples is required in order to give a total field error smaller than $D_{net}$. For a better understanding of these variables, reference may be made to the Appendix (Kashyap, supra).

Obtain a maximum number of sensors $N_{max}$ that the user can be expected to deploy (212).

For each compression algorithm "Alg" under consideration (e.g. point-to-point, distributed coding, multiplexed point-to-point), and for every $N_{max} >= N >= N_{mi}$, obtain each individual sensor's rate and quantization level of the sample required to meet the user distortion requirements $D_{net}$. These parameters are called RATE(Alg,N) and DIST(Alg,N) (214).

We note that establishing the step of obtaining the maximum number of sensors $N_{max}$ is preferably added for the purposes of limiting any computation that the last step above may entail. The present invention by no means places intrinsic limits on how large $N_{max}$ is allowed to be since we show that our bandwidth requirements do not grow as the network becomes denser.

We associate with a sensor capable of signaling at rate RATE(Alg,N) and obtaining measurements with fidelity DIST(N) a cost using a cost function Cost(Alg,N, params). The cost reflects memory and processing power requirements to implement particular signal processing algorithms for the purposes of compression, signaling, etc. Other parameters "params" may be passed to the cost function say, to reflect the availability of different types of sensors and thus differing costs.

Preferably, a cost-effective coding technique will have been chosen to fulfill the following:

minimize N Cost(N, params)
over all N such that Nmin<=N<=Nmax
and over all feasible params We pause to comment on the fundamental insight that makes it feasible to design very dense networks without increasing the bandwidth requirements beyond a maximum independent of the density of the network.

As one deploys sensors closer to each other in a network, the sensor's measurements start to become more and more correlated. Correspondingly, it becomes feasible to have individual sensors take measurements with high distortion, which are then combined at a fusion center to improve each of the sensor's measurements. Moreover, these high distortion measurements may be further compressed via use of distributed coding techniques. The extent to which individual sensors can relax their distortion requirements is key to this invention; in the attached paper by Kashyap it is shown how such distortion can be increased as one increases the number of sensors while maintaining total field reconstruction distortion as well as total bandwidth requirements.

As also may be appreciated from the Appendix (Kayshap, supra), there are tradeoffs between various sensor network parameters like number of sensors, degree of quantization at each sensor, and the distortion requirements.

As discussed heretofore, there are essentially two coding schemes that may preferably be implemented in accordance with the embodiments of the present invention. One such scheme is multiplexed point to point coding, in which a coding scheme at the sensors does not make any use of correlation between samples for the goal of further compressing the measurements taken at the sensors. While at the other extreme is centralized (or joint) coding, which is an idealized case but not realistic (as it requires that an encoder having access to all the sample values be observed by all sensors), there is considered herewith, instead, a distributed coding scheme. As contemplated in accordance with at least one embodiment of the present invention, a distributed coding scheme makes use of a statistical correlation of the data so that the sensors can achieve better compression, while encoding their samples without any collaboration.

In the Appendix (Kashyap, supra), it is shown that for a given distortion requirement, the rate required by distributed coding stays no more than a constant away from the rate required by joint coding of all the samples as the number of sensors becomes large. More pertinently, as also discussed in the Appendix (Kashyap, supra), it has been proven (D. Slepian and J. Wolf, "Noiseless coding of correlated information sources," *Transactions on Information Theory*, vol. IT-19, pp. 471-480, July 1973) that the optimal sum rate of distributed source coding is the same as the optimal rate of joint coding: for noiseless coding of discrete sources there is no inherent loss in rate in distributed coding. A lossy distributed source coding (L-DSC) problem is, however, still unsolved. In general, it is possible that the minimum total rate required by the best lossy distributed coding is greater than the minimum total rate required by a joint encoding of the sources. Moreover, this rate loss might increase with the number of samples being coded. For example, the redundancy of a quantization scheme discussed in R. Zamir and T. Berger, "Multiterminal source coding with high resolution," (*IEEE Transactions on Information Theory*, vol. 45, pp. 106-117, January 1999) increases linearly with the number of samples.

Kashyap, supra (in the Appendix) does demonstrate the utility of distributed source coding as a way of reducing the sum rate. As the number of sensors increases, they are packed more densely, and the data of sensors located close together becomes increasingly correlated. Reducing this redundancy in data using the knowledge of the statistical correlation between sensor observations is therefore attractive. The increasing correlation between the data can be utilized in such a way that the rate-penalty of distributed coding does not grow unboundedly as the number of samples being coded grows. Further mathematical corroboration of this can be found in the paper.

Generally, it can be seen that for any given distortion requirement $D_{net}$, the sum rate of distributed coding is no more than a constant away from the rate of joint coding. Therefore, as the number (and therefore the density) of samples increases, one can make do with increasingly coarsely quantized estimates of those samples at the fusion center (hub).

Inasmuch as a distributed coding scheme in theory has been demonstrated to provide significant advantages, practical implementation, as discussed heretofore, remains quite elusive. Accordingly, a simple, workable, multiplexed point to point coding scheme is broadly contemplated herein, in accordance with at least one embodiment of the present invention, by way of affording a practical implementation that itself presents significant advantages. Reference may continue to be made to the Appendix (Kashyap, supra) to appreciate detailed mathematical constructs of a preferred multiplexed point to point coding scheme, while FIGS. 3A and 3B provide a generalized flowchart (starting with FIG. 3A and continuing to FIG. 3B) for such a scheme. Generally, it can be shown that if sensors are synchronized and if a delay that increases linearly with the number of sensors is tolerable, then a desired tradeoff (of sensor numbers to sensor accuracy) can be achieved by a simple scheme in which encoding can be performed at sensors by using simple scalar or vector quantizers.

As shown in FIG. 3A, a stationary field autocorrelation function is first preferably obtained or established (402), normalized so that each sample of the field has unit variance. Next, a desired reconstruction error $D_{net}$ is preferably obtained or established (404). Subsequently, K is chosen to be an integer that minimizes the sum rate R(k) as shown in the figure (406).

Next, the quantity ϵ is preferably set equal to a desired bit rate penalty threshold (to control a tradeoff between rate and latency) (408), and the quality value $D_K$ is then preferably set (410) with the quantity m' (sensor reconstruction vector quantizer blocklength) then chosen as shown in the figure. Methods of designing vector quantizers in this context are well-known in the conventional literature. Then, a number of sensors N is preferably (though not necessarily) obtained as a multiple of K (412).

Preferably, a user is then communicated with (414) to the effect of imparting requirements on a sum bit rate R(K), sensor reconstruction vector quantizer blocklength m' and quality $D_K$. The sensors are then preferably partitioned into K contiguous groups of N/K sensors each (416).

Turning to step (418), during consecutive time units of N/K, within each group of sensors, each sensor preferably takes one measurement, with only one sensor in a group taking a measurement at any given time. Preferably, sensor measurement data is preferably taken at one sensor at a time, with multiple groups each taking one sample at the same time. Thus, data may be taken simultaneously by "Sensor 1" of "Group 1", "Sensor 1" of "Group 2", until the groups are exhausted. In the next time step, data is taken by "Sensor 2" of "Group 1", "Sensor 2" of "Group 2", etc. Of course, this is not meant to be restrictive, and any conceivable sequence may be implemented. After a sensor takes m' measurements, the sensor preferably uses the vector quantizer to send data back to a data fusion center (e.g., hub 104 in FIG. 1), as discussed and appreciated hereinabove and in Kashyap, supra (in the Appendix).

With the process continuing as shown in FIG. 3B, the fusion center then preferably decodes information from each of the N sensors using N separate decoders of the vector quantizer (420). Finally (422), for each s in the interval (0,1), the fusion center preferably reconstructs the field value X(s) using the following algorithm:

Find the sensor (active or inactive) closest to the location s. From the group to which this sensor belongs, select the sensor that is active (this is, has taken a direct measurement). The location of this sensor is s*.

Multiply the decoded value for location s* times ρ(s-s*) (this is the value of the autocorrelation function with lag s-s*).

The result of the multiplication is the fusion center reconstruction for the field sample X(s).

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

Appendix

Distributed source coding in dense sensor networks

Akshay Kashyap[1], Luis Alfonso Lastras-Montaño[2], Cathy Xia[3], and Zhen Liu[3]

[1]Dept. of ECE, UIUC, Urbana, IL. Tel: 217-766-2537, Email: kashyap@uiuc.edu.
[2]IBM T.J. Watson Research Center, Yorktown Heights, NY. Email: lastrasl@us.ibm.com.
[3]IBM T.J. Watson Research Center, Hawthorne, NY. Emails: cathyx@us.ibm.com, zhenl@us.ibm.com.

Abstract

We study the problem of the reconstruction of a Gaussian field defined in $[0, 1]$ using $N$ sensors deployed at regular intervals. The goal is to quantify the total data rate required for the reconstruction of the field with a given mean square distortion. We consider a class of two-stage mechanisms which a) send information to allow the reconstruction of the sensor's samples within sufficient accuracy, and then b) use these reconstructions to estimate the entire field. To implement the first stage, the heavy correlation between the sensor samples suggests the use of distributed coding schemes to reduce the total rate. We demonstrate the existence of a distributed block coding scheme that achieves, for a given fidelity criterion for the reconstruction of the field, a total information rate that is bounded by a constant, independent of the number $N$ of sensors. The constant in general depends on the autocorrelation function of the field and the desired distortion criterion for the sensor samples. We then describe a scheme which can be implemented using only scalar quantizers at the sensors, without any use of distributed source coding, and which also achieves a total information rate that is a constant, independent of the number of sensors. While this scheme operates at a rate that is greater than the rate achievable through distributed coding and entails greater delay in reconstruction, its simplicity makes it attractive for implementation in sensor networks.

1 Introduction

In this paper, we consider a sensor network deployed for the purpose of sampling and reconstructing a spatially varying random process. For the sake of concreteness, let us assume that the area of interest is represented by the line segment $[0, 1]$, and that the for each $s \in [0, 1]$, the value of the random process is $X(s)$. For example, $X(s)$ may denote the value of some environmental variable, such as temperature, at point $s$.

A sensor network, for the purpose of this paper, is a system of sensing devices (sensors) capable of 1. taking measurements from the environment that they are deployed in, and 2. communicating the sensed data to a fusion center for processing.

The task of the fusion center is to obtain a reconstruction $\{\tilde{X}(s), s \in [0, 1]\}$ of the spatially varying process, while meeting some distortion criteria.

There has been great interest recently in performing such sensing tasks with small, low power sensing devices, deployed in large numbers in the region of interest [1], [2], [3] [4]. This interest is motivated by the commercial availability of increasingly small and low-cost sensors which have a wide array of sensing and communication functions built in (see, for example, [5]), and yet must operate with small, difficult to replace batteries.

Compression of the sensed data is of vital importance in a sensor network. Sensors in a wireless sensor network operate under severe power constraints, and communication is a power intensive operation. The rate at which sensors must transmit data to the fusion center in order to enable a satisfactory reconstruction is therefore a key quantity of interest. Further, in any communication scheme in which there is an upper bound (independent of the number of sensors) on the amount of data that the fusion center can receive per unit time, there is another obvious reason why the compressibility of sensor data is important - the average rate that can be guaranteed between any sensor and the fusion center varies inversely with the number of sensors. Therefore, any scheme in which the per-sensor rate decreases slower than inversely with the number of sensors will build backlogs of data at sensors for large enough number of sensors.

Environmental variables typically vary slowly as a function of space and it is reasonable to assume that samples at locations close to each other will be highly correlated. The theory of distributed source coding ([6], [7], [8]) shows that if the sensors have knowledge of this correlation, then it is possible to reduce the data-rate at which the sensors need to communicate, while still maintaining the property that the information conveyed by each sensor depends only on that sensor's measurements. Research on practical techniques ([9], [10], [11], [12], [13]) for implementing distributed source coding typically focuses on two correlated sources, with good solutions for the many sources problem still to be developed. Thus, in our work, we attack the problem at hand using the available theoretical tools which have their origins in [6].

This approach has been taken earlier in [1] and [2], which investigate whether it is possible to use such distributed coding schemes to reduce the *per-sensor* data rate by deploying a large *number* of sensors at closely spaced locations in the area of interest. In particular, it is investigated whether it is possible to construct coding schemes in which the per-sensor rate decreases inversely with the number of sensors. The conclusion of [1], however, is that if the sensors quantize the samples using scalar quantizers, and then encode them, the sum of the data rates of all sensors increases as the number of sensors increases (even with distributed coding), and therefore the per-sensor rate cannot be traded off with the number of sensors in the manner described above.

Later, though, it was demonstrated in [14] that there exists a distributed coding scheme which achieves a sum rate that is a constant independent of the number of sensors used (so long as there is a large enough number of sensors). The per-sensor rate of such a scheme therefore decreases inversely with the number of sensors, which is the trade-off of sensor number with per-sensor rate that was desired, but shown unachievable with scalar quantization, in [1]. Results similar to those of [14] for the case when a field of infinite size is sampled densely have since appeared in [3]. However, a question that still appears to be unresolved is whether it is possible to achieve a per-sensor rate that varies inversely with the number of sensors using a *simple* sensing (sampling, coding, and reconstruction) scheme.

This paper is an expanded version of [14]. We describe the distributed coding scheme of [14] in detail, and then study another sampling and coding scheme which achieves the desired decrease of per-sensor rate with the number of sensors. The two main properties of this scheme are that (1) it does not make use of distributed coding and therefore does not require the sensors to have any knowledge of the correlation structure of the spatial variable of interest, and (2) it can in fact be implemented using only scalar quantizers at the sensors for the purpose of coding the samples. The scheme utilizes the fact that the sensors are synchronized, which is already assumed in the models of [1], [2], [3], and is easily achievable in practice. Since scalar quantizers are easily implementable in sensors with very low complexity, this paper shows that it is possible achieve per-sensor rates that decrease inversely with the number of sensors with simple, practical schemes.

A brief outline of this paper is as follows: We pose the problem formally and establish notation in Section 1.1. We study the achievability of the above tradeoff with a distributed coding scheme in Section 2, and compare the rate of this coding scheme with that of a reference centralized coding scheme in Section 3. We describe the simple coding scheme mentioned above in Section 4. Some numerical results are presented in Section 5. We make some concluding remarks in Section 6.

1.1 Problem statement

1.1.1 Model for the spatial process

We take a discrete time model, and assume that the spatial process of interest is modeled by a (spatially) stationary, real-valued Gaussian random process, $X^{(i)}(s)$ at each time $i$, where $s$ is the space variable. The focus of this paper is the sampling and reconstruction of a finite section of the process, which we assume without loss of generality to be the interval $[0, 1]$. We follow conventional usage in referring to the spatial process $X^{(i)} = \{X^{(i)}(s), s \in [0,1]\}$ as the *field* at time $i$.

We assume that the field $X^{(i)}$ at time $i$ is independent of the field $X^{(j)}$ for any $j \neq i$, and has identical statistics at all times. (In what follows, we omit the time index when we can do so without any ambiguity.) For simplicity, we assume that $X$ is centered, $\mathcal{E}[X(s)] = 0$, and that the variance of $X(s)$ is unity, for all $s \in [0, 1]$. The autocorrelation function of the field is denoted as $$\rho(\tau) = \mathcal{E}\left[X(s)X(s+\tau)\right].$$

Following common usage, we sometimes refer to $\rho$ as the *correlation structure* of the field. Clearly, $\rho(0) = 1$, and $\rho(\tau) \leq 1$ for any $\tau$. We need only mild assumptions on the field $X$:

1. We assume that $X$ is mean-square continuous, which is equivalent to the continuity of $\rho$ at 0 (see, for example, [15]).

2. We assume that there is a neighborhood of 0 in which $\rho$ is non-increasing.

Note that all results in this paper extend to fields in higher dimensions. We restrict the exposition to one-dimensional fields for clarity and to avoid the tedious notation required for higher dimensional fields.

1.1.2 Assumptions on the sensor network

We assume that $N$ sensors are placed at regular intervals in the segment $[0, 1]$, with sensor $k$ being placed at $s_k = \frac{2k-1}{2N}$ for $k = 1, 2, \ldots, N$. Sensors are assumed to be synchronized, and at each time $i$, sensor $k$ can observe the value $X^{(i)}(s_k)$ of the field at its location, for each $k$. Sensor $k$ encodes a block of $m$ observations, $[X^{(1)}(s_k), X^{(2)}(s_k), \ldots, X^{(m)}(s_k)]$ into an index $I_k$ chosen from the set $\{1, 2, \ldots, \lfloor e^{mR_k} \rfloor\}$, where $R_k$ is the rate of sensor $k$, which we state in the units of nats per discrete time unit. We assume that the blocklength $m$ is the same at all sensors. The messages of the sensors are assumed to be communicated to the fusion center over a shared, rate constrained, noiseless channel. The fusion center then uses the received data to produce a reconstruction $\tilde{X}^{(i)}(s)$ of the field.

A *coding scheme* is a specification of the sampling and encoding method used at all sensors, as well as the reconstruction method used at the fusion center.

1.1.3 Error criterion

We refer to $\mathcal{E}(X^{(i)}(s) - \tilde{X}^{(i)}(s))^2$ as the mean square error (MSE) of the reconstruction of the field at point $s$ and time $i$. We measure the error in the reconstruction as the average (over a blocklength) integrated MSE, which is defined as $$J_{MSE}(m) = \frac{1}{m} \sum_{i=1}^{m} \int_0^1 \mathcal{E}\left(X^{(i)}(s) - \tilde{X}^{(i)}(s)\right)^2 ds. \tag{1}$$

We study coding schemes in which, for all large enough blocklengths $m$ and a specified positive constant $D_{net}$, the fusion center is able reconstruct the field with an integrated MSE of less than $D_{net}$, that is, schemes for which $$\lim_{m \to \infty} J_{MSE}(m) \leq D_{net}. \tag{2}$$

1.1.4 Sum rate

In this paper, we describe coding schemes in which for any given value of $D_{net}$ in (2), the sum rate, $\sum_{k=1}^{N} R_k$, is bounded above by some constant $\bar{R}$ independent of the number $N$ of sensors. The bound $\bar{R}$ may in general depend on $D_{net}$. This allows the per-sensor rate can be traded off with the number of sensors, so that for all $N$ large enough, the rate of each sensor is no more than a constant multiple of $\frac{1}{N}$.

1.2 Contributions

Our main contributions are:

1. We prove the existence of a distributed coding scheme in which, under the assumption that the correlation structure is known at each sensor, a sum rate that is independent of the number of sensors $N$ can be achieved.

2. We design a simple coding scheme which can be implemented using scalar quantization at sensors, which does not require the sensors to have any information about the correlation structure, and which makes use of the fact that the sensors are synchronized to achieve a sum rate that is a constant independent of $N$.

The latter scheme has the advantage of being simple enough to be implementable even with extremely resource-constrained sensors. However, the sum-rate achievable through this scheme is in general greater than the sum-rate achievable through distributed coding. Also, unlike distributed coding, this scheme entails a delay that increases with the number of sensors in the network.

2 Distributed coding

In this section we describe a distributed coding scheme which achieves the desired scaling.

2.1 Encoding and decoding

The scheme consists of $N$ encoders, $\{f_k\}_{k=1}^N$, where $f_k$ is the encoder at sensor $k$, and $N$ decoders, $\{g_k\}_{k=1}^N$ at the fusion center. For each $k$, the rate of $f_k$ is assumed to be $R_k$, and $f_k$ maps the block $$[X^{(1)}(s_k), X^{(2)}(s_k), \ldots, X^{(m)}(s_k)]$$

of samples to an index $I_k$ chosen from $\{1, 2, \ldots, \lfloor e^{mR_k} \rfloor\}$, which is then communicated to the fusion center. While the output of encoder $k$ may *not* depend on the *realizations* of the observations at any other sensor $i \neq k$, it is assumed that all sensors have knowledge of the statistics of the field (in particular, the function $\rho$ is assumed known at each sensor[1]) and utilize this information to compress their samples. The decoders may use the messages received from all encoders to produce their reconstruction:

$$\tilde{X}^{(1,\cdots,m)}(s_k) = g_k(f_1(X^{(1,\cdots,m)}(s_1)), \cdots, f_N(X^{(1,\cdots,m)}(s_N))),$$

where $X^{(1,\cdots,m)}(s_k)$ is shorthand for $[X^{(1)}(s_k), X^{(2)}(s_k), \ldots, X^{(m)}(s_k)]$, for $k = 1, \ldots, N$ and similarly for $\tilde{X}$.

2.2 Reconstructing the continuous field

The reconstruction of the field for those values of $s \in [0, 1]$ where there are no sensors is done in a two-step fashion as follows. In the first step, the estimates $\tilde{X}(s_k)$ of sensor samples are obtained as described above. Then, the value of the field between sensor locations is found by interpolation.

The interpolation $\tilde{X}(s)$ for $s \notin \{s_k | k = 1, \ldots, N\}$ is based on the minimum MSE estimator for $X(s)$ given the value of the sample closest to $s$. Formally, for any $s$, define $n(s) = \frac{2k+1}{2N}$ if $s \in [\frac{k}{N}, \frac{k+1}{N})$ as the location of the sample closest to $s$. Then, given $X(n(s))$, the minimum MSE estimate for $X(s)$ is given by $\mathcal{E}[X(s)|X(n(s))] = \rho(s - n(s))X(n(s))$. The reconstruction of the field at the fusion center is obtained by replacing $X(n(s))$ in this estimate with the quantized version $\tilde{X}(n(s))$, $$\tilde{X}(s) = \rho(s - n(s))\tilde{X}(n(s)). \tag{3}$$

While this two-step reconstruction procedure is not optimal in general, it suffices for our purposes.

2.3 Error analysis

Define $$J'_{MSE}(m) = \frac{1}{N}\sum_{k=1}^{N} \frac{1}{m}\sum_{i=1}^{m} \mathcal{E}\left(X^{(i)}(s_k) - \tilde{X}^{(i)}(s_k)\right)^2. \tag{4}$$

---

[1] In practice, the sensors need only know the vector $\left[\rho\left(\frac{1}{N}\right), \rho\left(\frac{2}{N}\right), \ldots, \rho\left(\frac{N-1}{N}\right)\right]$.

Using the upper bound found in equation (21) (Appendix A) on the error of the coding scheme described above, we see that $\lim_m J_{MSE}(m) \leq D_{net}$ is met if $\lim_m J'_{MSE}(m) \leq D'(N)$, where $$D'(N) = \left( \sqrt{D_{net} - \left(1 - \rho(\frac{1}{2N})^2\right)^2} - \sqrt{\rho^2(\frac{1}{2N})(1 - \rho^2(\frac{1}{2N}))} \right)^2, \qquad (5)$$

given that $N$ is large enough so that $1 - \rho^2\left(\frac{1}{2N}\right) < D_{net}$. It is easy to see that $D'(N)$ approaches $D_{net}$ from below as $N \to \infty$.

2.4 Sum rate

We now study the sum rate of the distributed coding scheme discussed above. We begin with finding the encoding rates required for achieving $$\lim_m J'_{MSE}(m) \leq D, \qquad (6)$$

for some constant $D$.

The rate region $\mathcal{R}(D)$ is defined as the set of all $N$-tuples of rates $(R_1, R_2, \ldots, R_N)$ for which there exist encoders $f_k$ and decoders $g_k$, for $k = 1, \ldots, N$, such that (6) can be met. If a rate vector belongs to the rate region, we say that the corresponding set of rates is achievable.

The rate-distortion problem in (6) is a Gaussian version of the Slepian-Wolf distributed coding problem [6]. Until recently, the rate region for this problem was not known for even 2 sources. An achievable region for two discrete sources first appeared in [16], and was extended to continuous sources in [7]. The extension to a general number of Gaussian sources appears in [17]. The two-source Gaussian distributed source coding problem was recently solved in [8], where the achievable region of [16] was found to be tight. The rate region is still not known for more than 2 sources. We use the achievable region found in [17].

Though the result is stated in [17] for individual distortion constraints on the sources, the extension to a more general distortion constraint is straightforward. We state the achievable region for distributed source coding in the form most useful to us in Theorem 1 below. In the statement of the theorem, we use $A \leftrightarrow B \leftrightarrow C$ to denote a Markov-chain relationship between random variables $A, B$ and $C$, that is, conditioned on $B$, $A$ is independent of $C$. Also, for any $S \subset \{1, \ldots, N\}$, $\mathbf{X}_S$ denotes the vector of those sources the indexes of which lie in the set $S$ and $S^c$ denotes the complement of the set $S$.

Theorem 1 $\mathcal{R}(D) \supset \mathcal{R}_{in}(D)$, where $\mathcal{R}_{in}(D)$ is the set of $N$-tuples of rates for which there exists a vector $\mathbf{U} \in \mathbb{R}^N$ of random variables that satisfies the following conditions.

*1.* $\forall S \subseteq \{1, 2, \ldots, N\}$, $\mathbf{U}_S \leftrightarrow \mathbf{X}_S \leftrightarrow \mathbf{X}_{S^c} \leftrightarrow \mathbf{U}_{S^c}$.

*2.* $\forall S \subseteq \{1, 2, \ldots, N\}$, $\sum_{i \in S} R_i \geq I(\mathbf{X}_S; \mathbf{U}_S | \mathbf{U}_{S^c})$.

*3.* $\exists \tilde{X}(\mathbf{U})$ *such that*

$$\frac{1}{N} \sum_{i=1}^N \mathcal{E}\left[\left(X(s_i) - \tilde{X}(s_i)(\mathbf{U})\right)^2\right] \leq D. \qquad (7)$$

Note that each of the rate-constraints in Theorem 1 forms some part of the boundary of the achievable region $\mathcal{R}_{in}$ (see, for example, [17]). In particular, the constraint on the sum rate is not implied by any other set of constraints.

Constructing a vector $\mathbf{U}$ satisfying the conditions of Theorem 1 corresponds to the usual construction of a forward channel for proving achievability in a rate-distortion problem. For each $i$, $U_i$ can be thought of as the encoding of $X(s_i)$.

We now construct a $\mathbf{U}$ that would suffice for our purposes. Consider a random vector $\mathbf{Z} \in \mathbb{R}^N$ that is independent of $\mathbf{X}$, and has a Gaussian distribution with mean 0 and covariance matrix $pI$, where $I$ is the identity matrix. Then $\mathbf{U} = \mathbf{X} + \mathbf{Z}$ satisfies the Markov chain constraints of Theorem 1. To find a good bound on the sum rate, we now find a lower bound on the variance $p$ for which there exists an estimator $\tilde{X}(\mathbf{X} + \mathbf{Z})$ which satisfies condition (7). Since $\mathbf{X} + \mathbf{Z}$ is jointly Gaussian with $\mathbf{X}$, the estimator which minimizes the MSE in (7) is the linear estimator, $$\tilde{\mathbf{X}}(\mathbf{X} + \mathbf{Z}) = \Sigma_{\mathbf{X}(\mathbf{X}+\mathbf{Z})}\Sigma_{\mathbf{X}+\mathbf{Z}}^{-1}(\mathbf{X} + \mathbf{Z}), \qquad (8)$$

where $\Sigma_{\mathbf{X}(\mathbf{X}+\mathbf{Z})} = \mathcal{E}[\mathbf{X}(\mathbf{X} + \mathbf{Z})^T]$ and $\Sigma_{\mathbf{X}} = \mathcal{E}[\mathbf{X}\mathbf{X}^T]$. Let $p_{\max}(N, D, \rho)$ be the largest value of $p$ for which the MSE achieved by this estimator satisfies (7). We prove below that for large enough $N$, $p_{\max}$ grows faster than linearly with $N$.

Lemma 1 *Let $\rho(\tau)$ be a symmetric autocorrelation function such that $\lim_{t \to 0} \rho(t) = 1$ and a threshold $\theta > 0$ exists for which*

1. $1 \geq \rho(\tau) \geq \rho(\theta) > 0$ if $\tau \in (0, \theta)$ and

2. *the inequality* $1 - \rho^2(\theta)/(1 + \theta) \leq D$ *holds.*

*Then*

$$\liminf_{N \to \infty} \frac{1}{N} p_{\max}(N, D, \rho) \geq \theta^2.$$

*Note:* The second condition can be met for all $D > 0$ since $1 - \rho^2(\theta)/(1 + \theta) \to 0$ as $\theta \to 0$.

*Proof:* We call a value of $p$ allowable if the expected reconstruction error in (7), with $\mathbf{U} = \mathbf{X} + \mathbf{Z}$, is less than $D$. We find the largest $p$ for the error criterion: $\mathcal{E}[(\tilde{X}(s_i) - X(s_i))^2] \leq D$ for each $i \in \{1, \ldots, N\}$, which is more stringent than the average error requirement of (7).

Let us consider the estimation of $X(s_1)$. Since $\tilde{X}(s_i)$ is the best linear estimate of $X(s_i)$ from the data $\mathbf{X} + \mathbf{Z}$, any other linear estimator cannot result in a smaller expected MSE. We take advantage of this observation and choose a linear estimator that although suboptimal, is simple to analyze and yet suffices to establish the lemma.

Our estimator for $X(s_1)$ shall be the scaled average $\alpha \sum_{1 \leq i \leq N\theta} X(s_i) + Z_i$, where $\alpha$ is a parameter to be optimized shortly. To estimate $X(s_i)$ for $i \neq 0$, simply substitute the samples used with those whose indexes lie in the set $\{i+1, \cdots, i+N\theta\}$ (or, for samples at the right edge of the interval $[0, 1]$, $\{i - N\theta, \cdots, i - 1\}$; this does not lead to any change in what follows because of the stationarity of the field).

It is not difficult to see that $$\mathcal{E}\left(X(s_1) - \alpha \sum_{1 \leq i \leq N\theta} X(s_i) + Z_i\right)^2$$

$$= \mathcal{E}[X(s_1)^2] - 2\alpha \sum_{1 \leq i \leq N\theta} \rho(i/N) + \alpha^2 \mathcal{E}\left(\sum_{1 \leq i \leq N\theta} X(s_i)\right)^2 + \alpha^2 \mathcal{E}\left(\sum_{1 \leq i \leq N\theta} Z_i\right)^2$$

$$\leq 1 - 2\alpha(N\theta - 1)\rho(\theta) + \alpha^2 N^2\theta^2 + \alpha^2 N\theta p$$

$$= [1 - 2\alpha N\theta\rho(\theta) + \alpha^2 N^2\theta^2 + \alpha^2 N\theta p] + 2\alpha\rho(\theta), \qquad (9)$$

where we have used the inequality $1 \geq \rho(\tau) \geq \rho(\theta)$ for $\tau \in (0, \theta)$ and the fact that the greatest integer not greater than $N\theta$ is at least $N\theta - 1$. The value of $\alpha$ that makes the bracketed expression in (9) smallest is equal to $\alpha^* = \frac{\rho(\theta)}{N\theta + p}$ (we do not optimize the entire expression for simplicity). Substitution of this value yields $$1 - \frac{\rho^2(\theta)}{1 + p/(N\theta)}\left(1 - \frac{2}{N\theta}\right).$$

Now let $\epsilon > 0$ be sufficiently small so that $\theta^2 - \epsilon\theta(1 + \theta) > 0$, and let $N$ be sufficiently large so that $\frac{2}{N\theta} < \epsilon$. We can always do this since $\theta$ only depends on $D$ and on the autocorrelation function. Now suppose that $p/N = \theta^2 - \epsilon\theta(1 + \theta)$, then $$1 - \frac{\rho^2(\theta)}{1 + p/(N\theta)}\left(1 - \frac{2}{N\theta}\right) \leq 1 - \frac{\rho^2(\theta)}{1 + p/(N\theta)}(1 - \epsilon)$$

$$= 1 - \frac{\rho^2(\theta)}{1 + \theta} \leq D.$$

The above implies that for $N$ sufficiently large, $\frac{1}{N}p_{\max}(N,D,\rho) \geq \theta^2 - \epsilon\theta(1+\theta)$. Taking the liminf, we obtain that for all sufficiently small $\epsilon > 0$, $$\liminf_{N \to \infty} \frac{1}{N} p_{\max}(N, D, \rho) \geq \theta^2 - \epsilon\theta(1+\theta).$$

Since $\epsilon > 0$ can be arbitrarily small, we obtain the desired conclusion. ◇

The purpose of this Lemma is only to establish that $p_{\max}(N,D,\rho)$ grows at least linearly with $N$. The constants presented were chosen for simplicity of presentation.

The following is our main result on the rate of distributed coding:

Proposition 1 *The sum rate of the distributed coding scheme described above is bounded above by a constant, independent of $N$.*

*Proof:* Consider a vector Gaussian channel with input $\mathbf{W} \in \mathbb{R}^N$ and output $\mathbf{Y} \in \mathbb{R}^N$, $\mathbf{Y} = \mathbf{W} + \mathbf{Z}$, where $\mathbf{Z}$ is as above, and where the power constraint on the input is given by $\mathcal{E}[\mathbf{W}^T\mathbf{W}] \leq N$. Since $\mathbf{Z}$ is distributed $N(0, pI)$, the capacity of this channel, $$\max_{\mathbf{W}} I(\mathbf{W}; \mathbf{W} + \mathbf{Z}) \text{ subject to } \mathcal{E}[\mathbf{W}^T\mathbf{W}] \leq N,$$

is equal to $\frac{N}{2} \log\left(1 + \frac{1}{p}\right)$ (see, for example, [18]).

Let $\epsilon > 0$ be any number smaller than $D_{net}$. We know from Section 2.3 that there is an $N_1$ such that for $N \geq N_1$, $D'(N) \geq D_{net} - \epsilon$. Further, from Lemma 1, we know that there exists some $N_2 \geq 0$ and a constant $\theta > 0$ such that for $N \geq N_2$, $p_{\max}(N, D_{net} - \epsilon, \rho) \geq \theta^2 N$. Clearly, $p_{\max}(N, D, \rho)$ is a non-decreasing function of $D$, and therefore for $N \geq \max\{N_1, N_2\}$, $p_{\max}(N, D'(N), \rho) \geq p_{\max}(N, D_{net} - \epsilon, \rho)$. It then follows that for $N \geq \max\{N_1, N_2\}$, $$I(\mathbf{X}; \mathbf{X} + \mathbf{Z}) \leq \frac{N}{2} \log\left(1 + \frac{1}{\theta^2 N}\right).$$

Then, using the inequality $\log(1+x) \leq x$, and using the result of Theorem 1 to substitute $\sum_{k=1}^{N} R_k$ for $I(\mathbf{X}; \mathbf{X} + \mathbf{Z})$, we see that $$\sum_{k=1}^{N} R_k = \frac{1}{2\theta^2}$$

is achievable. ◇

The constants in Proposition 1 have been chosen for simplicity. In general, the rates achievable by distributed coding are smaller than the bound found in Proposition 1.

3 Comparison with a reference scheme

In this section, we compare the rate of the distributed coding scheme discussed in Section 2 with a reference scheme, which for reasons that will become apparent below, we call as *centralized* coding.

The scheme consists of *one* centralized encoder $f$, which has access to samples taken at all sensors at times $\{1, \ldots, m\}$, and $N$ decoders, $\{g_k\}_{k=1}^{N}$ at the fusion center. The encoder maps the samples of the sensors, $X^{(1,\ldots,m)}(s_1, \ldots, s_N)$, into an index chosen from the set $\{1, 2, \ldots, \lfloor e^{mR_N^*} \rfloor\}$, where $R_N^*$ is the rate of the centralized scheme, and communicates this index to the fusion center. The decoder $g_k$ at the fusion center reconstructs the samples from sensor $k$ from the messages received from the centralized encoder, $$\tilde{X}^{(1,\ldots,m)}(s_k) = g_k(f(X^{(1,\ldots,m)}(s_1, \ldots, s_N))),$$

for $k = 1, \ldots, N$.

At the fusion center, the reconstruction of the field $\tilde{X}(s)$ is obtained in the same two-step manner described in Section 2.2: the fusion center constructs estimates $\tilde{X}(s_k)$ of the samples $X(s_k)$, for $k = 1, \ldots, N$ from the messages received from the sensors, and then interpolates between samples using (3).

Let $R_N^*(D_{net})$ be the smallest rate for which there exists an encoder $f$ and decoders $\{g_k\}_{k=1}^N$ such that the integrated MSE (1) achieved by the above scheme satisfies the constraint (2). Then, it is clear that $R_N^*(D_{net})$ is a lower bound on the rates of all schemes which use the two-step reconstruction procedure of Section 2.2. In this section we bound the excess rate of the distributed coding scheme of Section 2 over the rate $R_N^*(D_{net})$ of the centralized scheme.

3.1 Error analysis

Using the lower bound in Appendix A, equation (22), on the error (1) in terms of $J'_{MSE}(m)$ of (4) we conclude that for $N$ large enough, if $J_{MSE}(m) \leq D_{net}$, then $J'_{MSE}(m) \leq D''(N)$, where $$D''(N) = \frac{2\left(1 - \rho^2\left(\frac{1}{2N}\right)\right) + 2\sqrt{\left(1 - \rho^2\left(\frac{1}{2N}\right)\right)\left(1 - \rho^2\left(\frac{1}{2N}\right) + D_{net}\right)} + D_{net}}{\rho^2\left(\frac{1}{2N}\right)}$$

Note that $D''(N)$ approaches $D_{net}$ from above as $N \to \infty$.

3.2 Bounding the rate loss

Now, consider $$\mathbf{V}^* = \arg\min_{p(\mathbf{V}|\mathbf{X})} I(\mathbf{X}; \mathbf{V}), \text{ subject to } \frac{1}{N}\mathcal{E}\left[\|\mathbf{X} - \mathbf{V}\|_2^2\right] \leq D''(N). \tag{10}$$

From Section 3.1, it is clear that the rate of the centralized coding scheme, $R_N^*(D_{net})$ satisfies, for any $N$, $$R_N^*(D_{net}) \geq I(\mathbf{X}; \mathbf{V}^*).$$

We now use techniques similar to those in [19] to bound the redundancy of distributed coding over the rate of joint coding. Let $\mathbf{Z}$ be as in Proposition 1. Expanding $I(\mathbf{X}; \mathbf{X} + \mathbf{Z}, \mathbf{V})$ in two ways, we get $I(\mathbf{X}; \mathbf{X} + \mathbf{Z}) + I(\mathbf{X}; \mathbf{V}|\mathbf{X} + \mathbf{Z}) = I(\mathbf{X}; \mathbf{V}) + I(\mathbf{X}; \mathbf{X} + \mathbf{Z}|\mathbf{V})$, so that $$\begin{aligned} I(\mathbf{X}; \mathbf{X} + \mathbf{Z}) - I(\mathbf{X}; \mathbf{V}) &\leq I(\mathbf{X}; \mathbf{X} + \mathbf{Z}|\mathbf{V}) \\ &= I((\mathbf{X} - \mathbf{V}); (\mathbf{X} - \mathbf{V}) + \mathbf{Z}|\mathbf{V}). \end{aligned} \tag{11}$$

Since $\mathbf{V} \leftrightarrow (\mathbf{X} - \mathbf{V}) \leftrightarrow (\mathbf{X} - \mathbf{V}) + \mathbf{Z}$, we have $I((\mathbf{X} - \mathbf{V}); (\mathbf{X} - \mathbf{V}) + \mathbf{Z}|\mathbf{V}) \leq I((\mathbf{X} - \mathbf{V}); (\mathbf{X} - \mathbf{V}) + \mathbf{Z})$. Subject to the constraint in (10), $I((\mathbf{X} - \mathbf{V}); (\mathbf{X} - \mathbf{V}) + \mathbf{Z})$ is upper bounded by the capacity of a parallel Gaussian channel, with noise $\mathbf{Z}$ and input $\mathbf{W} = \mathbf{X} - \mathbf{V}$, the power constraint on which is given by $\frac{1}{N}\mathcal{E}[\|\mathbf{W}\|^2] \leq D''(N)$. The capacity of this channel is [18] $C = \frac{N}{2}\log\left(1 + \frac{D''(N)}{p}\right)$, and therefore from (11) and the definition (10) of $\mathbf{V}$ as the rate-distortion achieving random vector, we get $$\begin{aligned} I(\mathbf{X}; \mathbf{X} + \mathbf{Z}) - R_N^*(D_{net}) &\leq \frac{N}{2}\log\left(1 + \frac{D''(N)}{p}\right). \\ &\leq \frac{N}{2}\frac{D''(N)}{p}, \end{aligned}$$

where the second inequality follows because $\log(1 + x) \leq x$. From Section 3.1, we know that for any $\epsilon > 0$, there is a $N_1$ large enough so that for all $N \geq N_1$, $D''(N) \leq D_{net} + \epsilon$, and we can choose the variance $p$ of the entries of $\mathbf{Z}$ to be at least $N\theta^2$, where $\theta$ is as in Lemma 1, while still ensuring that $\mathbf{X} + \mathbf{Z}$ meets the requirements on the auxiliary random variable $\mathbf{U}$ of Theorem 1. Therefore, substituting $\sum_{i=1}^{N} R_i$ for $I(\mathbf{X}; \mathbf{X} + \mathbf{Z})$, and using Lemma 1 and the result of Section 3.1 we get that for any $\epsilon > 0$, there is an $N_1$ large enough so that for all $N \geq N_1$, $$\sum_{i=1}^{N} R_i - R_N^*(D_{net}) \leq \frac{D_{net} + \epsilon}{2\theta^2}. \tag{12}$$

We conclude that the rate of the distributed coding scheme of Section 2 is no more than a constant (independent of $N$) more than the rate of a centralized coding scheme with the same reconstruction procedure. Again, the constant in (12) has been chosen for simplicity of presentation and is in general much larger than the actual excess of the rate of the distributed coding scheme (see Section 5).

4 Point-to-point coding

The distributed coding scheme studied in Section 2 shows that the tradeoff of sensor numbers to sensor accuracy is achievable. However, it may not be feasible to implement complicated distributed coding schemes in simple sensors. In this section we show that if the sensors are synchronized and if a delay that increases linearly with the number of sensors is tolerable, then the desired tradeoff can be achieved by a simple scheme in which encoding can be performed at sensors without any knowledge of the correlation structure of the field.

In this scheme, we partition the interval $[0, 1]$ into $K$ equal sized sub-intervals, $[0, \frac{1}{K}], (\frac{1}{K}, \frac{2}{K}], \ldots, (\frac{K-1}{K}, 1]$. We specify $K$ later, but assume that $N > K$ sensors are placed uniformly in $[0, 1]$. We assume that $K$ divides $N$ for simplicity (so that there are an integer number, $\frac{N}{K}$, of samples in each interval).

Since the somewhat involved notation may obscure the simple idea behind the scheme, we explain it before describing the scheme in detail. We consider time in blocks of duration $\frac{N}{K}$ units each. The scheme operates overall with a blocklength of $m = m'\frac{N}{K}$, that is, $m'$ blocks, for some integer $m'$. Each sensor is active exactly once in any time interval that is $\frac{N}{K}$ units in duration. A sensor samples the field at its location only at those times when it is active. Each sensor uses a point-to-point code of blocklength $m'$ and rate $R_p$ nats per *active* time unit. The code is chosen appropriately so as to meet the distortion constraint. However, since the sensor is active only in $m'$ out of $m'\frac{N}{K}$ time units, the rate of the code *per time-step* is only $\frac{K}{N}R_p$ nats. We show below that the desired distortion can be achieved with a rate $R_p$ that is independent of $N$ and therefore the desired scaling can be achieved by the above scheme.

We now describe the scheme in detail. Consider the time instants $\{1, 2, \ldots, m'\frac{N}{K}\}$. Each sensor uses a code of blocklength $m = m'\frac{N}{K}$, which is constructed from a code of blocklength $m'$, as follows. For each $j$ in $\{1, 2, \ldots, \frac{N}{K}\}$ and each $l$ in $\{0, 1, \ldots, K-1\}$, sensor $\frac{N}{K}l + j$ (which is the $j$-th sensor from the left in the sub-interval $(\frac{l}{K}, \frac{l+1}{K}]$, and is at location $s_{\frac{N}{K}l+j}$) samples the field only at times $T_{l,j} = \{j, j + \frac{N}{K}, j + \frac{2N}{K}, \ldots, j + \frac{(m'-1)N}{K}\}$. It uses a code of rate $R_p$, to be specified below, to map the $m'$ samples $\{X^{(i)}(s_{\frac{N}{K}l+j}), i \in T_{l,j}\}$ to an element of the set $\{1, 2, \ldots, \lfloor e^{m'R_p}\rfloor\}$. The rate per-time unit of each sensor is therefore $\frac{1}{m'\frac{N}{K}}m'R_p = \frac{K}{N}R_p$ nats.

The fusion center consists of $N$ decoders, one for each sensor. Decoder $k$ constructs estimates of the samples encoded by sensor $k$ *using only messages received from sensor $k$*. Then, for each time $i = \frac{N}{K}l + j$ in $\{1, \ldots, m'\frac{N}{K}\}$, the fusion center has reconstructions $$\left[\tilde{X}^{(i)}(s_j), \tilde{X}^{(i)}(s_{\frac{N}{K}+j}), \tilde{X}^{(i)}(s_{\frac{2N}{K}+j}), \ldots, \tilde{X}^{(i)}(s_{\frac{(K-1)N}{K}+j})\right],$$

that is, one reconstruction for each sub-interval.

For any $s \in [0, 1]$, we denote the location of the (unique) sensor active within the interval $(\frac{l}{K}, \frac{l+1}{K}]$ to which $s$ belongs by $r^{(i)}(s)$. For each time instant $i$, the fusion center reconstructs the field for $s \neq r^{(i)}(s)$ as $$\tilde{X}^{(i)}(s) = \rho(s - r^{(i)}(s))\tilde{X}^{(i)}(r^{(i)}(s)),$$

where $\tilde{X}^{(i)}(r^{(i)}(s))$ is the decoded sample at the fusion center of the sensor at $r^{(i)}(s)$ at time $i$.

We show in Appendix B that $$\frac{1}{m}\sum_{i=1}^{m}\int_0^1 \mathcal{E}[(X^{(i)}(s) - \tilde{X}^{(i)}(s))^2]ds$$
$$\leq (1 - \rho^2(\frac{1}{K})) + \frac{1}{N}\sum_{k=1}^{N}\left\{\frac{1}{m'}\sum_{i_k \in T_k}\mathcal{E}[\left(X^{(i_k)}(s_k) - \tilde{X}^{(i_k)}(s_k)\right)^2]\right\} \quad (13)$$

where, with some abuse of notation, we use $T_k$ to denote the set of time steps in which sensor $k$ is active. Note that the cardinality of $T_k$ is $m'$ for each $k$.

We now choose $K$ large enough so that $(1 - \rho^2(\frac{1}{K})) < D_{net}$ and choose $$D_K = D_{net} - (1 - \rho^2(\frac{1}{K})). \quad (14)$$

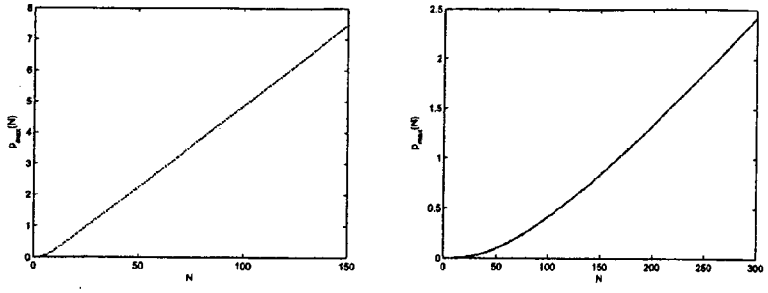

Figure 1: Linear increase of $p_{max}$ for large . ¨ $\rho(\tau) = \text{sinc}(\tau)$ (left) and $\rho(\tau) = \exp\{-|\tau|\}$ (right). $D_{net} = 0.1$.

The $m'$-blocklength code used at sensor $k$ for the times that it is active is a code that achieves the rate-distortion bound for the distortion constraint $$\frac{1}{m'} \sum_{i_k \in T_k} \mathcal{E}\left[\left(X^{(i_k)}(s_k) - \tilde{X}^{(i_k)}(s_k)\right)^2\right] \leq D_K,$$

as $m' \to \infty$. It is well known that the rate of this code is $R_p = \frac{1}{2} \log \frac{1}{D_K}$ nats per time step. It is clear from (13) and (14) that this scheme achieves the required distortion. Since the rate of each sensor in the overall scheme is $\frac{K}{N} R_p$ nats per time step we have therefore constructed a scheme in which the bit rate of each sensor is $$\frac{K}{N} \frac{1}{2} \log \left[D_{net} - (1 - \rho^2(\frac{1}{K}))\right] \quad (15)$$

nats per time step. We can now choose $K$ to minimize the sum-rate $-\frac{K}{2} \log \left[D_{net} - (1 - \rho^2(\frac{1}{K}))\right]$.

Further, it is well known (see [20, Section 5.1]) that using scalar quantization, each sensor can achieve distortion $D_K$ at rate $\frac{1}{2} \log \frac{1}{D_K} + \delta$, where $\delta$ is a small constant. For example, for Max-Lloyd quantizers (see [20, Section 5.1]), $\delta$ is less than 1 bit.

Therefore, we conclude that it is indeed possible to achieve the desired tradeoff between sensor numbers and the per-sensor rate even when the sensors encode their measurements using appropriate scalar quantizers, given that we also make use of the synchronization between sensors to activate sensors appropriately. This is in contrast to the conclusions of [1], where full use of synchronization is not made, and therefore it is found that the above tradeoff is not achievable with scalar quantization.

5 Numerical examples

In this section we give numerical examples of the rates of the coding schemes discussed in Section 2, Section 3 and Section 4. The two fields we consider as examples are (1) a (spatially) band-limited Gaussian field, for which $\rho(\tau) = \text{sinc}(\tau)$, where $\text{sinc}(\tau) = \frac{\sin(\pi\tau)}{\pi\tau}$, and (2) a Gauss-Markov field, for which $\rho(\tau) = \exp\{-|\tau|\}$.

For these fields, we numerically find the largest value $p_{max}$ of the variance $p$ of $Z$ for which the error for the estimator in (8) is no more than the distortion $D'(N)$ of (5), with $D_{net} = 0.1$. The resulting values are shown in Figure 1. We see that for large values of $N$, $p_{max}$ is indeed approximately linear in $N$.

We compute the achievable sum rate of the distributed source coding scheme, which is equal to $I(X; X + Z)$ from Theorem 1, with the $p_{max}$ found above as the variance of the entries of $Z$. These rates are shown in Figure 2. For reference, we also show the lower bound on the rate of the centralized coding scheme computed in Section 3.

In comparison, on minimizing the rate (15) of the point-to-point coding scheme of Section 4, we find that best sum rate for $\rho(\tau) = \text{sinc}(\tau)$ is 11.77 nats for $K = 7$ intervals, and that the best sum rate for $\rho(\tau) = \exp(-|\tau|)$ is 46.92 nats with $K = 24$ intervals, which is significantly greater than the sum-rate of the

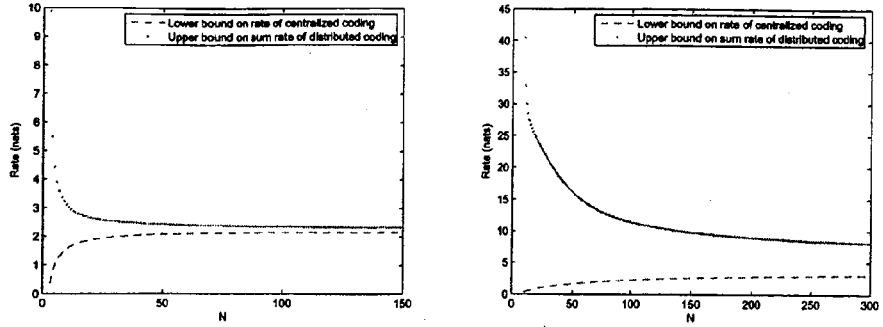

Figure 2: Rates of joint and distributed coding (in nats per snapshot) vs. number of sensors $N$: $\rho(\tau) = \text{sinc}(\tau)$ (left) and $\rho(\tau) = \exp\{-|\tau|\}$ (right). $D_{net} = 0.1$.

distributed coding scheme found above. However, part of the reason for the large sum-rate of the point-to-point coding scheme is that our analysis exaggerates an edge-effect for the sake of simplicity: In Section 4 we estimated the value of the field at point $s$ at time $i$ using the sample that the fusion center has at time $i$ from the sub-interval that $s$ lies in. We could instead have used the sample *closest* to $s$ that is available at the fusion center at time $i$, similar to what is done in Section 2 and Section 3. However, this would have meant dealing with the first and the last sub-interval differently, and therefore we did not follow the analysis outlined above. Without this edge effect, the rates of the point-to-point coding scheme are approximately half the rates found above, which are still considerably larger than the sum-rates of the distributed coding scheme.

6 Conclusions

We have studied the sum rate of distributed coding for the reconstruction of a random field using a dense sensor network. We have shown the existence of a distributed coding scheme which achieves a sum rate that is a constant independent of the number of sensors. Such a scheme is interesting because it allows us to achieve a per-sensor rate that decreases inversely as the number of sensors, and therefore to achieve small per-sensor rates using a large number of sensors.

In obtaining bounds on the sum rate of distributed coding, we made full use to the heavy correlation between samples of the field taken at positions that are close together. When the number of sensors is large, the redundancy in their data can be utilized by coding more and more coarsely: this corresponds to more noisy samples, and is manifested in the growth of the noise $p_{max}$ in the forward channel in Section 2. We believe that this technique of bounding the sum rate is of independent interest.

We have also shown that contrary to what has been suggested in [1] and [3], it is indeed possible to design a scheme that achieves a constant sum rate with sensors that are scalar quantizers, even *without* the use of distributed coding. This scheme, however, requires that we make appropriate use of the synchronization between the sensors, results in a delay in reconstruction which increases linearly with the number of sensors, and achieves rates that may be significantly higher than the rates achieved by distributed coding. The scheme is nevertheless interesting because its low complexity makes it easy to implement.

Acknowledgement

The first author thanks Prof. R. Srikant for many insightful comments on this work, and for his encouragement to work on this paper while the first author was at UIUC.

A  Bounds on $J_{MSE}(m)$ for the schemes in Section 2 and Section 3

We can write the error in reconstruction at any $s \in [0,1]$ as $$\begin{aligned}
X(s) - \tilde{X}(s) &= X(s) - \rho(s - n(s))\tilde{X}(n(s)) \\
&= [X(s) - \rho(s - n(s))X(n(s))] + \left[\rho(s - n(s))\left(X(n(s)) - \tilde{X}(n(s))\right)\right] \\
&= E_S(s) + E_Q(s),
\end{aligned} \qquad (16)$$

where $E_S(s) = X(s) - \rho(s - n(s))X(n(s))$ and $E_Q(s) = \rho(s - n(s))\left(X(n(s)) - \tilde{X}(n(s))\right)$. Note that in the schemes described in Section 2 and Section 3, the encodings of all samples are used to obtain the estimate $\tilde{X}(n(s))$, and therefore $\tilde{X}(n(s))$ is in general not independent of $X(s_k)$, for $s_k \neq n(s)$. As a result, $E_S(s)$ and $E_Q(s)$ are in general not independent. In this appendix, we find upper and lower bounds on $J_{MSE}(m)$ that hold for the schemes of Section 2 and Section 3.

Using the Cauchy-Schwarz inequality (for any two appropriately integrable random variables $A$ and $B$, $|\mathcal{E}[AB]| \leq \sqrt{\mathcal{E}[A^2]\mathcal{E}[B^2]}$), it is easy to see that $$\mathcal{E}(E_S(s) + E_Q(s))^2 \leq \mathcal{E}(E_S(s))^2 + \mathcal{E}(E_Q(s))^2 + 2\sqrt{\mathcal{E}(E_S(s))^2 \mathcal{E}(E_Q(s))^2} \qquad (17)$$

$$\mathcal{E}(E_S(s) + E_Q(s))^2 \geq \mathcal{E}(E_Q(s))^2 - 2\sqrt{\mathcal{E}(E_S(s))^2 \mathcal{E}(E_Q(s))^2}. \qquad (18)$$

Now, note that $\mathcal{E}(E_S(s))^2 = (1 - \rho^2(s - n(s))$. Therefore, $$\mathcal{E}(E_S(s))^2 \mathcal{E}(E_Q(s))^2 = \rho^2(s - n(s))\left(1 - \rho^2(s - n(s))\right) \mathcal{E}\left(X(n(s)) - \tilde{X}(n(s))\right)^2.$$

For $N$ large enough so that both $\rho^2\left(\frac{1}{2N}\right) \geq \frac{1}{2}$ and $1/(2N)$ lies in the interval around 0 in which $\rho$ is non-increasing (so that for $s \in \left(\frac{k}{N}, \frac{k+1}{N}\right)$ $\rho^2(s - n(s))(1 - \rho^2(s - n(s)) \leq \rho^2(\frac{1}{2N})(1 - \rho^2(\frac{1}{2N}))$, which holds because the function $h(x) = x(1 - x)$ is decreasing in $[\frac{1}{2}, 1]$), we get that $$\mathcal{E}(E_S(s))^2 \mathcal{E}(E_Q(s))^2 \leq \rho^2\left(\frac{1}{2N}\right)\left(1 - \rho^2\left(\frac{1}{2N}\right)\right) \mathcal{E}\left(X(n(s)) - \tilde{X}(n(s))\right)^2. \qquad (19)$$

From (1) and (16), we have $$J_{MSE}(m) = \frac{1}{m}\sum_{i=1}^{m}\int_0^1 \mathcal{E}\left(E_S^{(i)}(s) + E_Q^{(i)}(s)\right)^2 ds. \qquad (20)$$

Therefore, integrating (17) and (18) over $[0,1]$, using (19) and Jensen's inequality (and the concavity of the function $y(x) = \sqrt{x}$), and averaging over the time index, we get $$J_{MSE}(m) \leq \left\{1 - \rho^2\left(\frac{1}{2N}\right)\right\} + J'_{MSE}(m) + 2\sqrt{\rho^2(\frac{1}{2N})(1 - \rho^2(\frac{1}{2N}))J'_{MSE}(m)}, \qquad (21)$$

$$J_{MSE}(m) \geq \rho^2(\frac{1}{2N})J'_{MSE}(m) - 2\sqrt{\rho^2(\frac{1}{2N})(1 - \rho^2(\frac{1}{2N}))J'_{MSE}(m)}, \qquad (22)$$

where $J'_{MSE}(m)$ is as in (4).

B  Error analysis for the point-to-point coding scheme

With some abuse of notation, we can still write the error in reconstruction as $$X(s) - \tilde{X}(s) = E_S(s) + E_Q(s),$$

where now $$E_S(s) = X(s) - \rho(s - r(s))X(r(s)), \text{ and}$$
$$E_Q(s) = \rho(s - r(s))\left(X(r(s)) - \tilde{X}(r(s))\right).$$

In the point-to-point coding scheme, the fusion center estimates the samples of each sensor using only the messages that it receives from that particular sensor. Note that $E_S^{(i)}(s)$ is the error in the optimal MSE estimate of $X(s)$ given $X^{(i)}(r(s))$. It is well known that if $\{X(s), s \in [0,1]\}$ is a Gaussian process, the error $E_S^{(i)}(s)$ in is independent of $X^{(i)}(r^{(i)}(s))$. Further, due to the independence of the field $X^{(i)}$ and the field $X^{(j)}$ for any $j \neq i$, $E_S^{(i)}(s)$ is independent of $X^{(j)}(r^{(j)}(s))$ for all $j$, and hence also of the reconstructions $\tilde{X}^{(j)}(r^{(j)}(s))$ and the error terms $E_Q^{(i)}(s)$. Therefore, for any $i$, $$\mathcal{E}[(X^{(i)}(s) - \tilde{X}^{(i)}(s))^2] = \mathcal{E}[(E_S^{(i)}(s))^2] + \mathcal{E}[(E_Q^{(i)}(s))^2].$$

Now, for $K$ large enough, $\mathcal{E}[(E_S^{(i)}(s))^2] = 1 - \rho^2(s - r^{(i)}(s)) \leq 1 - \rho^2(\frac{1}{K})$ for every $s \in [0,1]$. Also, since $\rho^2(s) \leq 1$ for all $s \in [0,1]$, $$\mathcal{E}[(E_Q^{(i)}(s))^2] \leq \mathcal{E}[\left(X^{(i)}(r^{(i)}(s)) - \tilde{X}^{(i)}(r^{(i)}(s))\right)^2].$$

So, we get $$\int_0^1 \mathcal{E}[(X^{(i)}(s) - \tilde{X}^{(i)}(s))^2]ds = \sum_{l=0}^{K-1} \int_{\frac{l}{K}}^{\frac{l+1}{K}} \mathcal{E}[(X^{(i)}(s) - \tilde{X}^{(i)}(s))^2]ds$$
$$\leq \sum_{l=0}^{K-1} \int_{\frac{l}{K}}^{\frac{l+1}{K}} (1 - \rho^2(\frac{1}{K})) + \mathcal{E}[\left(X^{(i)}(r^{(i)}(s)) - \tilde{X}^{(i)}(r^{(i)}(s))\right)^2]ds$$
$$= (1 - \rho^2(\frac{1}{K})) + \frac{1}{K}\sum_{l=0}^{K-1} \mathcal{E}[\left(X^{(i)}(r^{(i)}(\frac{l+1}{K})) - \tilde{X}^{(i)}(r^{(i)}(\frac{l+1}{K}))\right)^2],$$

where we note that by our notation, $r^{(i)}(\frac{l+1}{K})$ is the location of the (unique) sensor active at time step $i$ in the interval $(\frac{l}{K}, \frac{l+1}{K}]$.

Now summing over the time index we get, $$\frac{1}{m}\sum_{i=1}^m \int_0^1 \mathcal{E}[(X^{(i)}(s) - \tilde{X}^{(i)}(s))^2]ds$$
$$\leq (1 - \rho^2(\frac{1}{K})) + \frac{1}{Km}\sum_{i=1}^m \sum_{l=0}^{K-1} \mathcal{E}[\left(X(r^{(i)}(\frac{l+1}{K})) - \tilde{X}(r^{(i)}(\frac{l+1}{K}))\right)^2].$$

Rearranging the sum on the right and substituting $m = \frac{m'N}{K}$ we get $$\frac{1}{m}\sum_{i=1}^m \int_0^1 \mathcal{E}[(X^{(i)}(s) - \tilde{X}^{(i)}(s))^2]ds$$
$$\leq (1 - \rho^2(\frac{1}{K})) + \frac{1}{m'N}\sum_{k=1}^N \sum_{i_k \in \mathcal{T}_k} \mathcal{E}[\left(X^{(i_k)}(s_k) - \tilde{X}^{(i_k)}(s_k)\right)^2],$$
$$= (1 - \rho^2(\frac{1}{K})) + \frac{1}{N}\sum_{k=1}^N \left\{\frac{1}{m'}\sum_{i_k \in \mathcal{T}_k} \mathcal{E}[\left(X^{(i_k)}(s_k) - \tilde{X}^{(i_k)}(s_k)\right)^2]\right\}$$

where $\mathcal{T}_k$ is the set of time steps in which sensor $k$ is active.

References

[1] D. Marco, E. J. Duarte-Melo, M. Liu, and D. L. Neuhoff, "On the many-to-one transport capacity of a dense wireless sensor network and the compressibility of its data," in *Lecture notes in Computer Science*, L. J. Guibas and F. Zhao, Eds. Springer, 2003, pp. 1–16.

[2] A. Scaglione and S. D. Servetto, "On the interdependence of routing and data compression in multi-hop sensor networks," in *Proc. of IEEE MOBICOM*, 2002.

[3] D. Neuhoff and S. Pradhan, "An upper bound to the rate of ideal distributed lossy source coding of densely sampled data," in *Proc. of IEEE ICASSP*, 2006.

[4] P. Ishwar, A. Kumar, and K. Ramchandran, "On distributed sampling in dense sensor networks: a "bit-conservation" principle," *submitted to IEEE Journal on Selected Areas in Communication*, July 2003.

[5] Crossbow Technologies, "MICA2DOT datasheet," Available online at http://www.xbow.com/Products/productsdetails.aspx?sid=73.

[6] D. Slepian and J. Wolf, "Noiseless coding of correlated information sources," *Transactions on Information Theory*, vol. IT-19, pp. 471–480, July 1973.

[7] R. Zamir and T. Berger, "Multiterminal source coding with high resolution," *IEEE Transactions on Information Theory*, vol. 45, pp. 106–117, January 1999.

[8] A. B. Wagner, S. Tavildar, and P. Viswanath, "Rate-region of the quadratic Gaussian two-terminal source-coding problem," February 2006, submitted to IEEE Transactions on Information Theory.

[9] S. S. Pradhan and K. Ramchandran, "Distributed source coding using syndromes (DISCUS): design and construction," *IEEE Transactions on Information Theory*, March 2003.

[10] T. P. Coleman, A. H. Lee, M. Medard, and M. Effros, "Low-complexity approaches to slepian-wolf near-lossless distributed data compression," *IEEE Transactions on Information Theory*, submitted for publication.

[11] V. Stankovic, A. Liveris, Z. Xiong, and C. Georghiades, "On code design for the general Slepian-Wolf problem and for lossless multiterminal communication networks," *IEEE Transactions on Information Theory*, submitted for publication.

[12] J. Li, Z. Tu, , and R. S. Blum, "Slepian-wolf coding for nonuniform sources using turbo codes," in *Proc. of IEEE/ACM Data Compression Conference*, March 2004.

[13] J. Chen, D. He, , and A. Jagmohan, "Slepian-wolf code design via source-channel correspondence," in *Proc. of IEEE International Symposium on Information Theory*, July 2006.

[14] A. Kashyap, L. A. Lastras-Montaño, C. Xia, and Z. Liu, "Distributed coding in dense sensor networks," in *Proc. of IEEE/ACM Data Compression Conference*, 2005.

[15] B. Hajek, *An Exploration of Random Processes for Engineers.* Available online at http://www.ifp.uiuc.edu/~hajek/Papers/randomprocesses.html, 2006.

[16] T. Berger, "Multiterminal source coding," in *The Information Theory Approach to Communication*, G. Longo, Ed. Springer, 1977.

[17] P. Viswanath, "Sum rate of multiterminal Gaussian source coding," in *DIMACS Series in Discrete Mathematics and Theoretical Computer Science*, 2002.

[18] T. M. Cover and J. A. Thomas, *Elements of Information Theory.* New York: Wiley, 1991.

[19] R. Zamir, "Rate loss in the Wyner-Ziv problem," *IEEE Transactions on Information Theory*, vol. 42, no. 6, pp. 2073–2084, November 1996.

[20] T. Berger, *Rate Distortion Theory.* Englewood Cliffs, N.J.: Prentice-Hall, Inc., 1971.

What is claimed is:

1. A method of managing a sensor network, said method comprising the steps of:
   obtaining input related to sensor network characteristics;
   optimizing a cost function on the basis of obtained input, wherein said optimizing comprises:
      choosing a constant K to minimize a sum rate;
      setting a bit rate penalty threshold;
      setting a quality value; and
      setting a sensor reconstruction vector quantizer blocklength;
   based on the cost function, choosing a number of sensors from which to obtain data, wherein the number of sensors is chosen such that individual sensors take measurements with higher distortion due to correlation with measurements of close sensors while maintaining total field reconstruction distortion as well as total bandwidth requirements;
   partitioning the sensors into groups;
   taking sensor measurements with all groups of sensors;
   accepting sensor measurement data as quantitized estimates at a predetermined location; and
   constructing a field data sample at the predetermined location.

2. The method according to claim 1, wherein said accepting step comprises obtaining the sensor measurement data from one sensor at a time.

3. The method according to claim 1, wherein said obtaining step comprises:
   obtaining a field autocorrelation function; and
   obtaining a reconstruction error.

4. The method according to claim 3, wherein said step of obtaining the field autocorrelation function comprises normalizing the field autocorrelation function.

5. The method according to claim 1, further comprising the step of communicating to a user requirements on:
   a sum bit rate;
   the sensor reconstruction vector quantizer blocklength; and
   the quality value.

6. The method according to claim 5, wherein said choosing step comprises choosing the number of sensors as a function of K.

7. The method according to claim 5, wherein said choosing step comprises choosing the number of sensors as a multiple of K.

8. The method according to claim 6, wherein said partitioning step comprises partitioning the sensors into contiguous groups.

9. The method according to claim 1, wherein:
   said taking step comprises employing a vector quantizer;
   said optimizing step further comprises setting a sensor reconstruction vector quantizer blocklength; and
   said accepting step further comprises accepting a number of measurements from each sensor corresponding to the sensor reconstruction vector quantizer blocklength.

10. The method according to claim 1, wherein said constructing step comprises:
    decoding information each of sensor via employing decoders of a vector quantizer;
    finding a sensor closest to a given location;
    choosing an active sensor from a group corresponding to the sensor closest to the given location; and
    establishing a data reconstruction for the field sample of the sensor closest to the given location via multiplying a decoded value for the active sensor.

11. An apparatus for managing a sensor network, said apparatus comprising:
    an arrangement for obtaining input related to sensor network characteristics;
    an arrangement for optimizing a cost function on the basis of obtained input, wherein said optimizing comprises:
       choosing a constant K to minimize a sum rate;
       setting a bit rate penalty threshold;
       setting a quality value; and
       setting a sensor reconstruction vector quantizer blocklength;
    a choosing arrangement which, based on the cost function, chooses a number of sensors from which to obtain data, wherein the number of sensors is chosen such that individual sensors take measurements with higher distortion due to correlation with measurements of close sensors while maintaining total field reconstruction distortion as well as total bandwidth requirements;
    a partitioning arrangement which partitions the sensors into groups;
    an accepting arrangement which accepts sensor measurements as quantitized estimates taken from all groups of sensors; and
    a constructing arrangement which constructs a field data sample.

12. The apparatus according to claim 11, wherein said accepting arrangement acts to obtain sensor measurement data from one sensor at a time.

13. The apparatus according to claim 11, wherein said obtaining arrangement acts to:
    obtain a field autocorrelation function; and
    obtain a reconstruction error.

14. The apparatus according to claim 1, further comprising an arrangement for communicating to a user requirements on:
    a sum bit rate;
    the sensor reconstruction vector quantizer blocklength; and
    the quality value.

15. The apparatus according to claim 14, wherein:
    said choosing arrangement acts to choose the number of sensors as a function of K; and
    said partitioning arrangement acts to partition the sensors into contiguous groups.

16. The apparatus according to claim 11, wherein:
    said accepting arrangement acts to accept vector quantitized estimates at a predetermined location;
    said optimizing arrangement acts to set a sensor reconstruction vector quantizer blocklength; and
    said accepting step further acts to accept a number of measurements from each sensor corresponding to the sensor reconstruction vector quantizer blocklength.

17. The apparatus according to claim 11, wherein said constructing arrangement acts to:
    decode information each of sensor via employing decoders of a vector quantizer;
    find a sensor closest to a given location;
    choose an active sensor from a group corresponding to the sensor closest to the given location; and
    establish a data reconstruction for the field sample of the sensor closest to the given location via multiplying a decoded value for the chosen active sensor.

18. A program storage device readable by machine, tangibly embodying a program of instructions executable by the machine to perform method steps for managing a sensor network, said method comprising the steps of:
- obtaining input related to sensor network characteristics;
- optimizing a cost function on the basis of obtained input, wherein said optimizing comprises:
  - choosing a constant K to minimize a sum rate;
  - setting a bit rate penalty threshold;
  - setting a quality value; and
  - setting a sensor reconstruction vector quantizer block-length;
- based on the cost function, choosing a number of sensors from which to obtain data, wherein the number of sensors is chosen such that individual sensors take measurements with higher distortion due to correlation with measurements of close sensors while maintaining total field reconstruction distortion as well as total bandwidth requirements;
- partitioning the sensors into groups;
- accepting sensor measurement data as quantitized estimates taken from all groups of sensors at a predetermined location; and
- constructing a field data sample at the predetermined location.

* * * * *